(No Model.)  2 Sheets—Sheet 1.

M. WILSON.
DOUBLE FURROW PLOW.

No. 393,135.  Patented Nov. 20, 1888.

Attest.
A. Edmunds,
Carl Hayden.

Inventor.
Malcolm Wilson,
By P. J. Edmunds,
Atty.

(No Model.) 2 Sheets—Sheet 2.

M. WILSON.
DOUBLE FURROW PLOW.

No. 393,135. Patented Nov. 20, 1888.

Attest
A. Edmunds.
Carl Hayden.

Inventor.
Malcolm Wilson,
By P. J. Edmunds.
Atty.

United States Patent Office.

MALCOLM WILSON, OF LONDON, ONTARIO, CANADA, ASSIGNOR OF ONE-HALF TO DAVID SMITH, OF SAME PLACE.

DOUBLE-FURROW PLOW.

SPECIFICATION forming part of Letters Patent No. 393,135, dated November 20, 1888.

Application filed November 14, 1887. Serial No. 255,158. (No model.)

*To all whom it may concern:*

Be it known that I, MALCOLM WILSON, a subject of the Queen of Great Britain, and a resident of the city of London, in the Province of Ontario, Canada, have invented certain new and useful Improvements in Double-Furrow Plows; and I do hereby declare that the following specification, taken in connection with the accompanying drawings, forms a full, clear, and exact description of this invention.

The present invention has general reference to improvements in double-furrow plows; and it consists, especially, in the simple and peculiar combination of parts and the improved construction, as hereinafter first fully set forth and described, and then pointed out in the claims.

Figure 1:
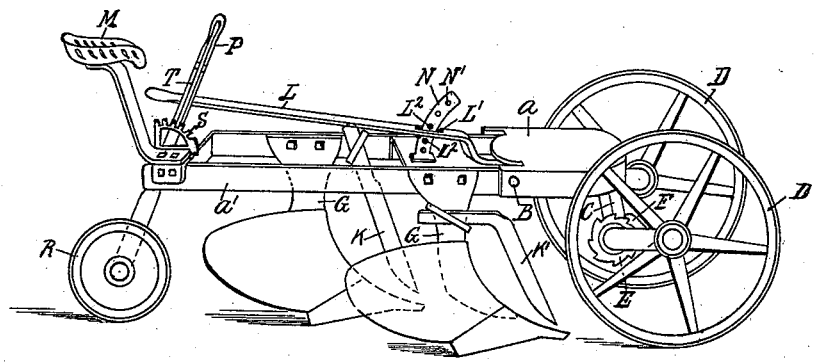
Figure 2:
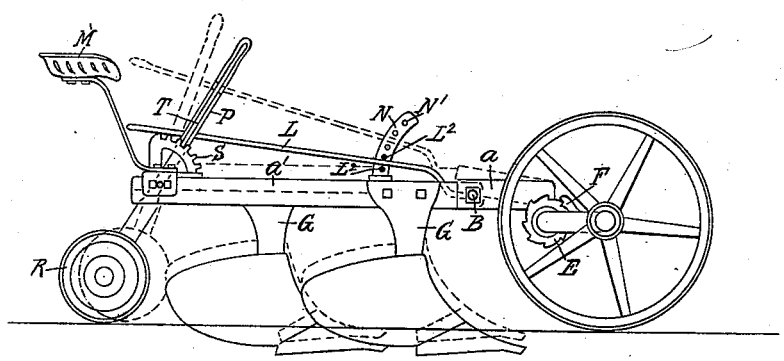
Figure 3:
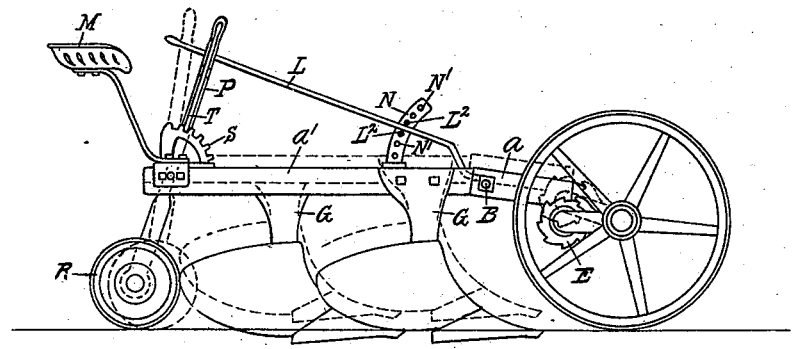
Figures 4, 5:
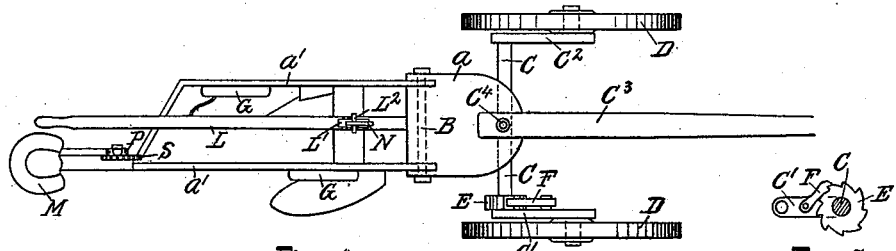

In the drawings already mentioned, which serve to illustrate my said invention more fully, Figure 1 is a perspective view of a double-furrow plow embodying my invention. Fig. 2 is a side elevation of same. The dotted lines in this figure show it adjusted for light plowing or skimming. In this view the colters are removed. Fig. 3 shows the plow adjusted for light plowing or skimming, and the dotted lines in this figure show the plows adjusted clear from the ground. Fig. 4 is a plan view of same. Fig. 5 is a detail side elevation of the ratchet and dog in connection with the front axle.

$a$ designates a frame secured to the axle C and tongue $C^3$ by a king-bolt, $C^4$. In this frame $a$ the bar B is rigidly secured.

$C'$ $C^2$ are arms pivotally secured near one end on the axle C, and D D are wheels revolving on cranks formed on or stud-pins secured in the opposite ends of these arms $C'$ $C^2$, and E is a ratchet rigidly secured on the axle C, and F is a dog pivoted on the arm $C'$ in position to engage with said ratchet E.

$a'$ designates the plow-frame, which is pivotally secured to the bar B. To this plow-frame $a'$ the plow-standards G G are rigidly secured.

P designates a lever pivoted on the plow-frame $a'$, on the lower end of which lever P the gage-wheel R is held and revolves perfectly free, and S is a cog-segment secured on the frame $a'$, and T is a dog which is adjusted and held on the lever P to engage with or disengage from the teeth of the cog-segment S, to hold this lever P at the position to which it is adjusted.

L is a lever rigidly secured to the bar B, and N is a segment secured to the frame $a'$. This segment N extends through a slot, $L'$, formed in the lever L, and this lever L, as well as the frame $a$, to which the lever is rigidly secured by the bar B, is held at any position to which it is adjusted by means of the pins $L^2$, passing through perforations $N'$ in the segment N.

K K' are colters secured to the standards G G, and M is a seat for the driver.

This double-furrow plow is adjusted for different classes of plowing as follows: As shown by the solid lines in Fig. 2, this plow is adjusted for ordinary plowing, and by adjusting the levers L and P to the position shown by dotted lines in Fig. 2 the frame $a'$ and plows are raised horizontally for light plowing or skimming. These dotted lines in Fig. 2 and the solid lines in Fig. 3 represent the plow in the same position.

By adjusting the ratchet E and arm $C'$ to the position shown by dotted lines in Fig. 3 and the lever P to the position shown by dotted lines in Fig. 3, the plows are raised horizontally clear from the ground to the position required when traveling along the road or from one field to another.

Having thus described my invention, I claim—

1. In a double-furrow plow, the combination of the lever L, rigidly secured by the bar B to the frame $a$, and formed with a slot, $L'$, frame $a$, and segment N, formed with perforations $N'$, and pins $L^2$, with the frame $a'$, carrying the plow-standards G G, lever P, gage-wheel R, cog-segment S, and the dog T, as and for the purpose set forth.

2. In a double-furrow plow, the combination of the ratchet E, axle C, frame $a$, arms $C'$ $C^2$, dog F, and wheels D D, with the frame $a'$, carrying the plow-standards G G, lever P, gage-wheel R, cog-segment S, and dog T, as and for the purpose set forth.

In testimony whereof I affix my signature in the presence of the two undersigned witnesses.

MALCOLM WILSON.

Witnesses:
P. J. EDMUNDS,
A. EDMUNDS.